United States Patent [19]
Gross

[11] Patent Number: 5,386,932
[45] Date of Patent: Feb. 7, 1995

[54] SELF-TIGTENING, BELT-ATTACHABLE FISHING ROD HOLDER

[76] Inventor: Charles E. Gross, 112 Maxwell Dr., Bristol, Tenn. 37620

[21] Appl. No.: 202,739

[22] Filed: Feb. 28, 1994

[51] Int. Cl.⁶ ............................................. A01K 97/00
[52] U.S. Cl. ..................... 224/200; 224/253; 224/254; 224/901; 224/907; 224/922; 43/21.2
[58] Field of Search ......................... 224/200, 224–226, 224/253, 254, 901, 907, 922; 43/21.2

[56] References Cited

U.S. PATENT DOCUMENTS

| | | | |
|---|---|---|---|
| D. 222,964 | 2/1972 | Woodbury | 43/21.2 |
| 2,576,624 | 11/1951 | Miller | 224/200 X |
| 2,598,021 | 5/1952 | Schwanke | 224/922 X |
| 2,658,650 | 11/1953 | Jasper | 224/200 |
| 2,709,544 | 5/1955 | Barringer | 224/200 |
| 2,735,596 | 2/1956 | Smedley et al. | 224/922 X |
| 2,803,387 | 8/1957 | Pearce | 224/922 X |
| 2,846,129 | 8/1958 | O'Brien | 224/922 X |
| 3,556,365 | 1/1971 | Bull | 224/922 X |
| 3,874,573 | 4/1975 | Fruscella et al. | 224/922 X |
| 3,889,860 | 6/1975 | Lindsey | 224/922 X |
| 4,565,025 | 1/1986 | Behale | 43/21.2 |
| 4,603,499 | 8/1986 | Simborski | 43/21.2 X |
| 5,050,830 | 9/1991 | Hall | 224/901 X |
| 5,123,578 | 6/1992 | Morse | 224/151 |
| 5,240,156 | 8/1993 | Sicotte et al. | 224/224 X |

FOREIGN PATENT DOCUMENTS

| | | | |
|---|---|---|---|
| 0451410 | 4/1946 | Canada | 43/21.2 |
| 2557423 | 7/1985 | France | 43/21.2 |
| 0010333 | 7/1916 | United Kingdom | 224/922 |
| 0581392 | 10/1946 | United Kingdom | 224/922 |

Primary Examiner—J. Casimer Jacyna
Attorney, Agent, or Firm—Peter J. Van Bergen

[57] ABSTRACT

A belt-attachable holder for a fishing rod is provided. An upper portion forms an integral belt-attaching means. A lower portion is suspended from the upper portion and includes a substantially stiff planar member. A coil is provided to have at least one full turn sized to receive the fishing rod when the coil is in a relaxed state. The coil has first and second ends that are fixed to the stiff planar member. A sleeve of flexible material is open at a top portion thereof and is sized at the top portion to receive the fishing rod. The sleeve terminates at a substantially closed bottom maintained in a fixed relationship to the lower portion a vertical distance below the coil. The top portion has its perimeter aligned with and supported by the one full turn of the coil such that the fishing rod can be inserted into the sleeve through the top portion and the one full turn. The weight of the fishing rod causes the one full turn of the coil to tighten around the fishing rod along with the top portion of the sleeve. In addition, the upper portion can be faced with one side of a hook-and-loop fastening system to serve as a surface of attachment for the complementary side of the fastening system adhered to a fly rod reel. In this way, the holder can support the fly rod extending from the fly rod reel.

21 Claims, 5 Drawing Sheets

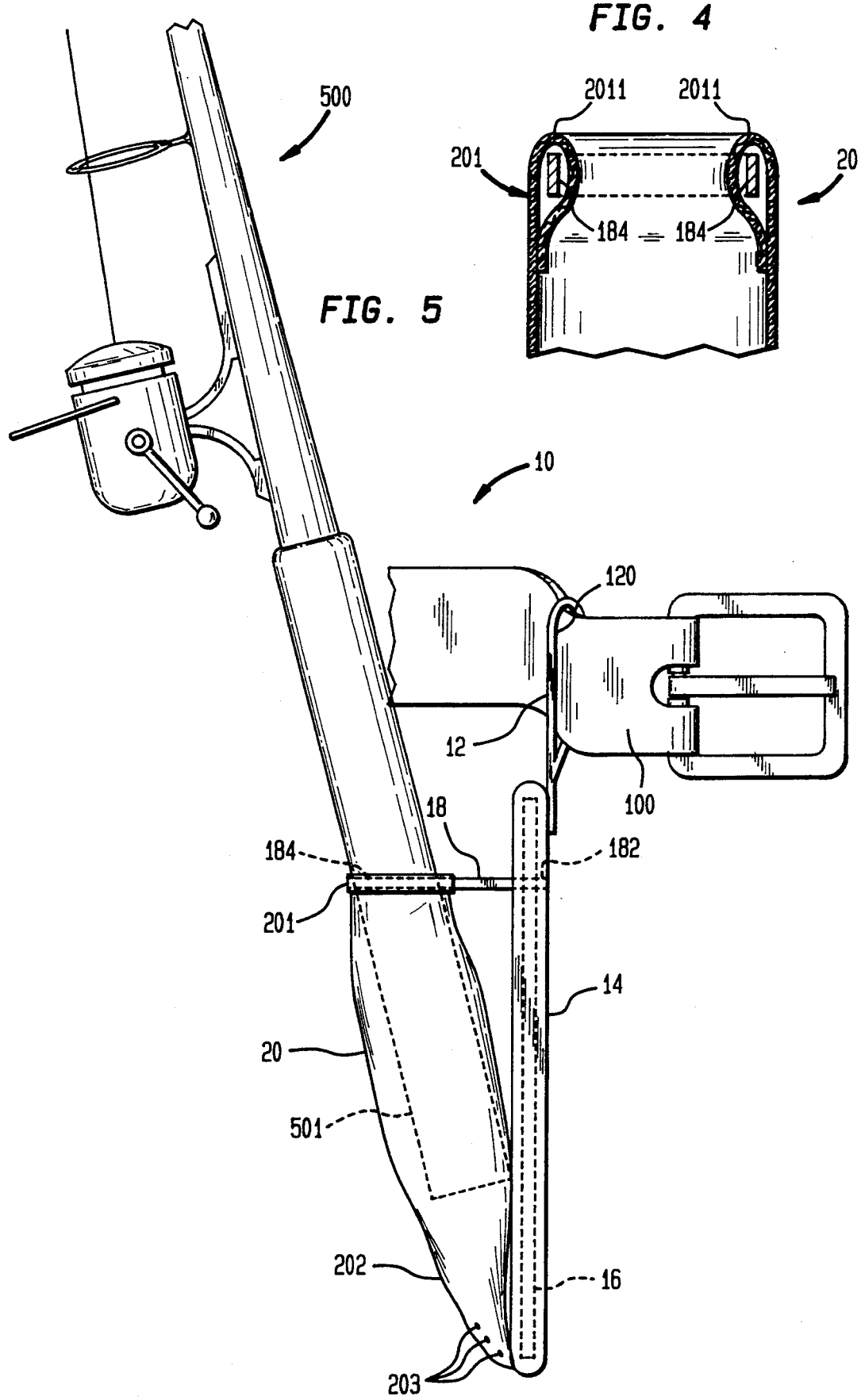

SELF-TIGTENING, BELT-ATTACHABLE FISHING ROD HOLDER

FIELD OF THE INVENTION

The invention relates generally to fishing accessories, and more particularly to a fishing rod holder that can be attached to a fisherman's belt for holding a standard fishing rod or fly rod.

BACKGROUND OF THE INVENTION

Many fishing scenarios call for the fisherman to stand in tall grass or weeds and/or wade out into water. When it comes time to change lures or remove a fish from the line, both hands of the fisherman are required. However, the tall grass, weeds and/or water environments do not present a convenient place for the fisherman to lay down his rod.

Accordingly, a variety of belt-hung fishing rod holsters have been developed in the prior art. For example, in U.S. Pat. No. 3,874,573, a one-piece fishing rod holster fastenable to a fisherman's belt is disclosed. A plurality of loops extending from the holster body accept a fishing rod's handle. However, if the holster angle is changed, i.e., the fisherman bends over, then the rod will slide out from the loops. Furthermore, the disclosed holster offers no solution in the case of fly fishing where there is no rod handle extending beyond the cylindrical reel.

Another fishing rod holster, disclosed in U.S. Pat. No. 5,123,578, consists of a rigid belt-attached structure for supporting a fishing rod during use and for holding the fishing rod during portage. However, the structure requires the use of a separate attachable retainer strip which must be fastened in place on the holster to prevent the fishing rod from falling out during portage.

SUMMARY OF THE INVENTION

Accordingly, it is an object of the present invention to provide a belt-attached holder for a rod, e.g., fishing rod.

Another object of the present invention is to provide a belt-attached holder for a fishing rod that securely holds the fishing rod in place regardless of the angular orientation of the holder.

Yet another object of the present invention is to provide a belt-attached holder for a fishing rod that holds the fishing rod in place merely by placing the fishing rod in the holder.

Still another object of the present invention is to provide a belt-attached fishing rod holder that is usable from either the left or right side of the fisherman.

An additional object of the present invention is to provide a belt-attached holder for a fishing rod that includes the capability to hold a fly fishing rod and reel assembly.

Other objects and advantages of the present invention will become more obvious hereinafter in the specification and drawings.

In accordance with the present invention, a belt-attachable holder for a fishing rod includes an upper portion forming an integral belt-attaching means. A lower portion is suspended from the upper portion and houses a substantially stiff planar member extending downward through the lower portion in a substantially vertical orientation. A coil is provided to have at least one full turn sized to receive the fishing rod when the coil is in a relaxed state. The coil has first and second ends that are fixed to the stiff planar member. A sleeve of flexible material is open at a top portion thereof and is sized at the top portion to receive the fishing rod. The sleeve terminates at a substantially closed bottom maintained in a fixed relationship to the lower portion a vertical distance below the coil. The top portion has its perimeter aligned with and supported by the one full turn of the coil such that the fishing rod can be inserted into the sleeve through the top portion and the one full turn to extend to the substantially closed bottom. The weight of the fishing rod causes the one full turn of the coil to tighten around the fishing rod along with the top portion of the sleeve.

BRIEF DESCRIPTION OF THE DRAWINGS

FIG. 4 is a cross-sectional view of the top portion of the sleeve taken along line 4—4 of FIG. 3;

FIG. 5 is a side view of the holder of the present invention as it would be used to hold a standard rod and reel assembly.

DETAILED DESCRIPTION OF THE INVENTION

Figure 1:
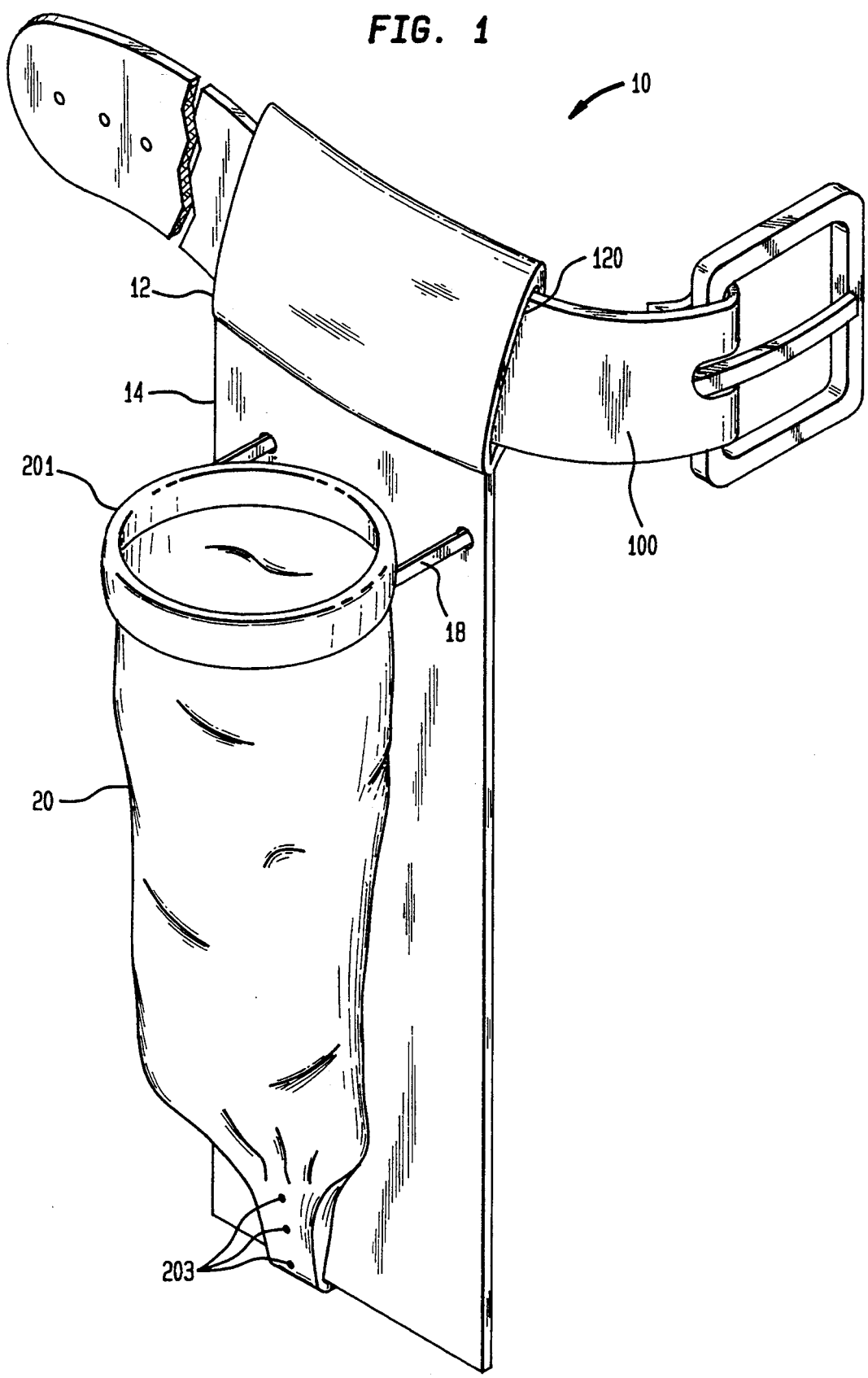
FIG. 1 is a perspective view of a preferred embodiment of the self-tightening, belt-attachable holder for a fishing rod according to the present invention.
Figure 2:
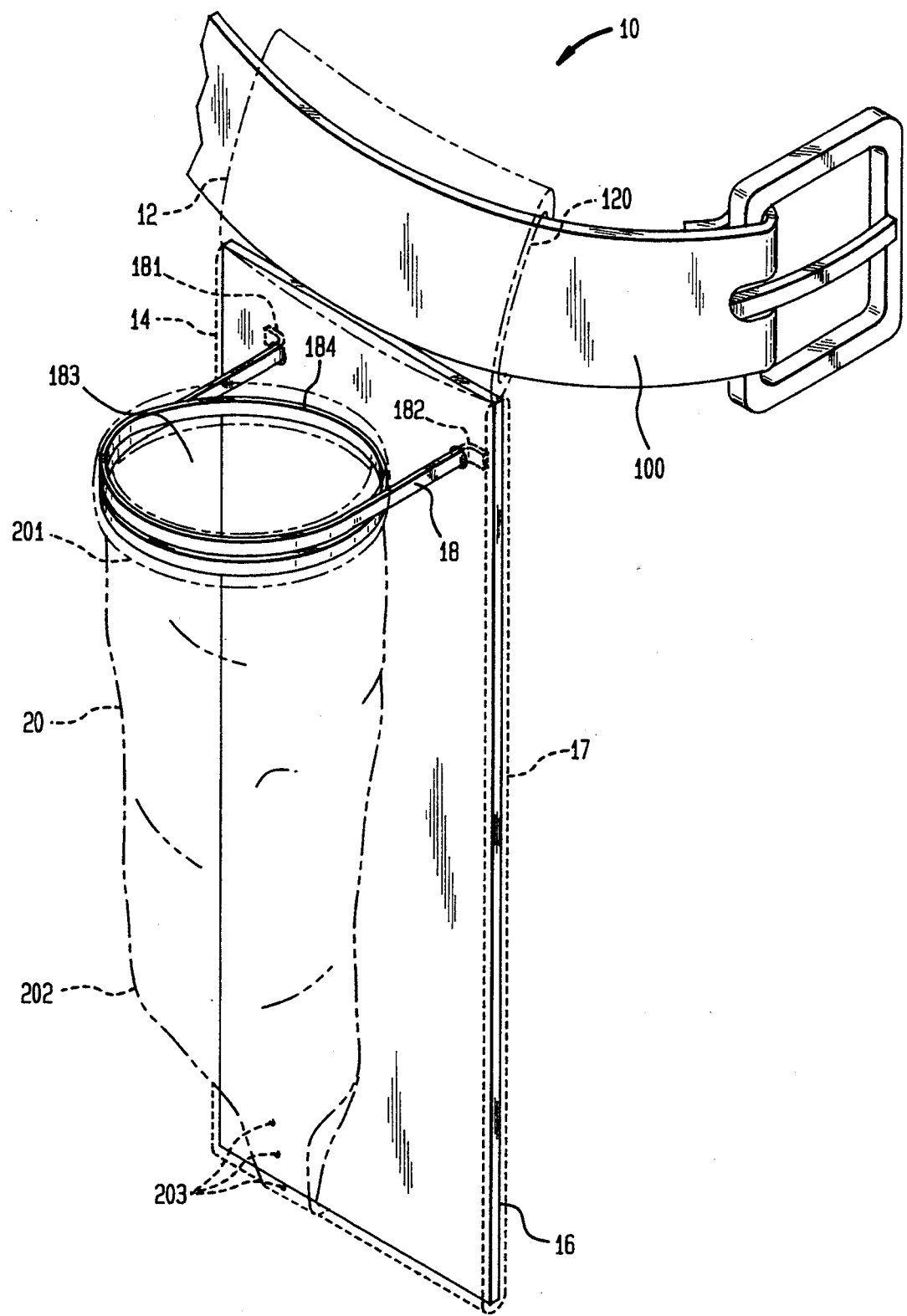
FIG. 2 is a perspective view of the preferred embodiment with the stiff backing and tensioning strap shown in solid lines and the upper and lower portion cloth supports shown in dotted lines.
Figure 3:
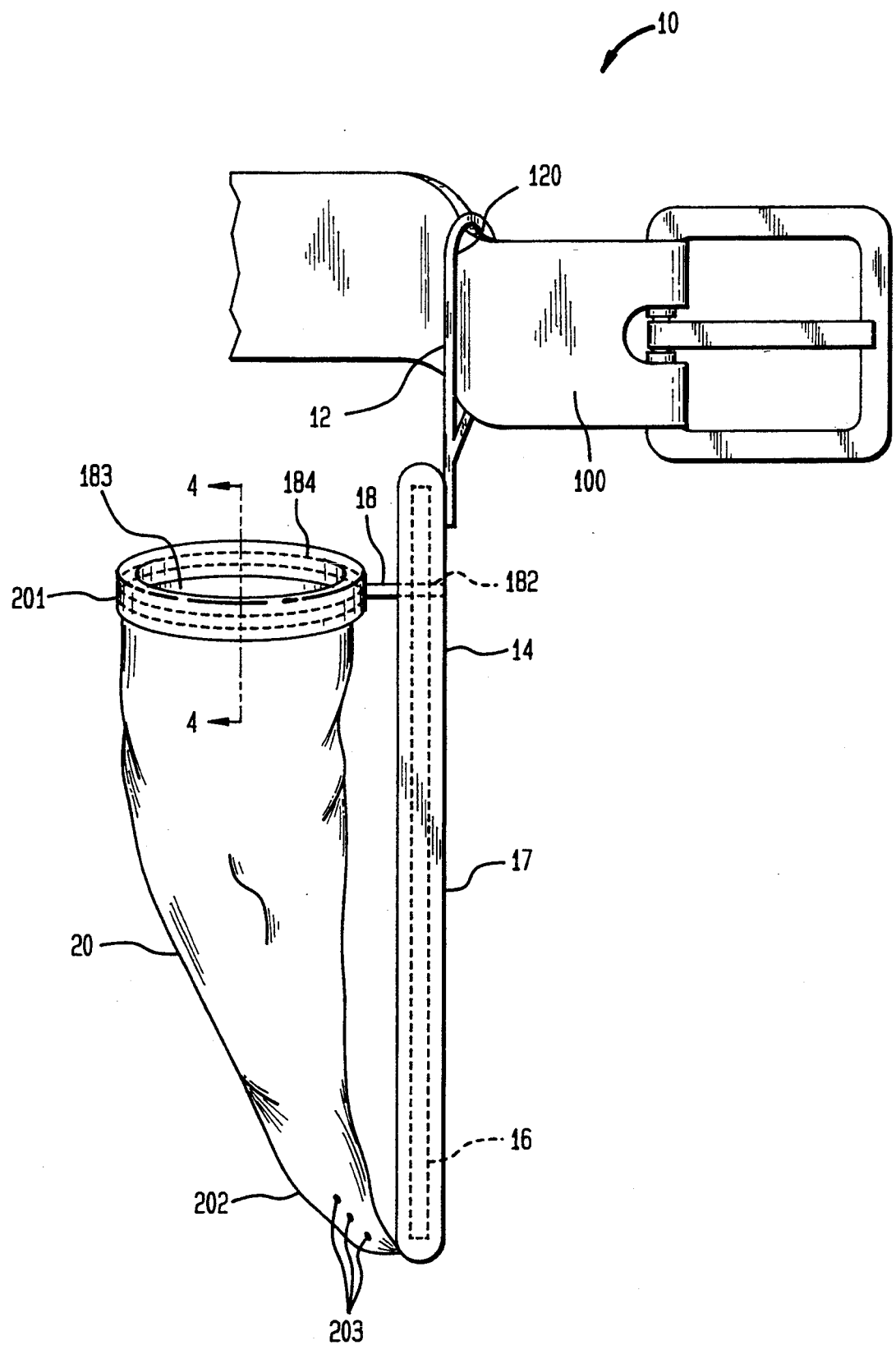
FIG. 3 is a side view of the preferred embodiment with the stiff backing and tensioning strap shown in dotted lines and the upper and lower portion cloth supports shown in solid lines.

Referring now to the drawings, and more particularly to FIGS. 1, 2 and 3, the self-tightening, belt-attachable holder for a fishing rod according to the present invention is shown and referenced generally by the numeral 10. Holder 10 consists of upper portion 12 and lower portion 14 which includes stiff, generally flat member 16 optionally maintained in housing or support 17, tensioning coil or strap 18, and sleeve 20. For clarity of illustration, the perspective view of FIG. 2 depicts only member 16 and strap 18 in solid line form to emphasize their relationship to one another, while the side view of FIG. 3 depicts only upper portion 12, support 17 and sleeve 20 in solid line form to emphasize their relationship to one another.

Upper portion 12 forms at least one integral loop (only one is shown) 120 for permitting a user's belt 100 to pass therethrough as a means of support for holder 10. It is to be understood that loop 120 may be permanently closed as shown or attachably closed by means of snaps, buttons, zipper, hook-and-loop fastener, etc. placed along the length of loop 120. Typically, upper portion 12 is made from cloth or leather.

Lower portion 14 extends, either fixedly as shown or in an attachable manner, down from upper portion 12. For purpose of the illustrative embodiment, support 17 is made from cloth integral with or attached (e.g., stitched) to upper portion 12 to form a housing for flat member 16. In an alternative embodiment, member 16 could be adhered to support 17. In still another alternative embodiment, support 17 could be eliminated leaving just member 16 attached to and supported from upper portion 12.

Member 16 is constructed from a relatively rigid material such as leather or plastic for reasons that will become clearer hereinbelow. Extending from an upper section of member 16 is tensioning coil or strap 18. Strap 18 is affixed to member 16 at ends 181 and 182 by any conventional means such as stapling, stitching, tacking, fusing, etc. Strap 18 is configured as a coil having at least one full turn 184 as shown. In its relaxed state, opening 183 formed by strap 18 should be large enough to accept the handle portion of a fishing rod (not shown in FIGS. 1, 2 and 3). Strap 18 can be made from an inelastic material such as plastic or an elastic material.

Sleeve 20 includes top portion 201 that is open and bottom portion 202 that is closed. Sleeve 20 is typically on the order of 6–8 inches in length. Bottom portion 202 can be provided with holes 203 so that water may easily drain therefrom. Top portion 201, and typically all of sleeve 20, is constructed from a flexible material, e.g., cloth, rubber, etc. In the illustrative embodiment, top portion 201 includes perimeter sleeve 2011 encasing full turn 184 of strap 18 as shown in the cross section of FIG. 4 which has been taken along line 4—4' of FIG. 3. In other words, top portion 201 is tethered to member 16 and the opening of top portion 201 and opening 183 formed by full turn 184 are essentially aligned and coincident with one another. Bottom portion 202 is fixed or removably attachable to lower portion 14 and/or member 16 by any conventional means. For example, fixed attachment can be by means of stitching, stapling, gluing, etc., while removable attachment can be by means of snaps, toggles, hook-and-loop-fastener, etc.

In operation, a fishing rod 500 with handle 501 is inserted into sleeve 20 via the opening in top portion 201 and one full turn 184 until it comes to rest on bottom portion 202 as shown in FIG. 5. The weight of rod 500 causes sleeve 20 to pull away from lower portion 14/member 16. Since member 16 is stiff and bottom portion 202 is fixed to lower portion 14 and/or member 16, strap 18 is placed in tension. In this way, strap 18 tightens along with top portion 201 around handle 501. The tension imposed by the weight of rod 500 maintains strap 18 in its tightened state regardless of the orientation of holder 10. Thus, once handle 501 is placed in sleeve 20, rod 500 is automatically held securely in place. This frees up both of the fisherman's hands and allows the fisherman to bend over since change in orientation of holder 10 does not appreciably effect the tension in strap 18.

Figure 6:
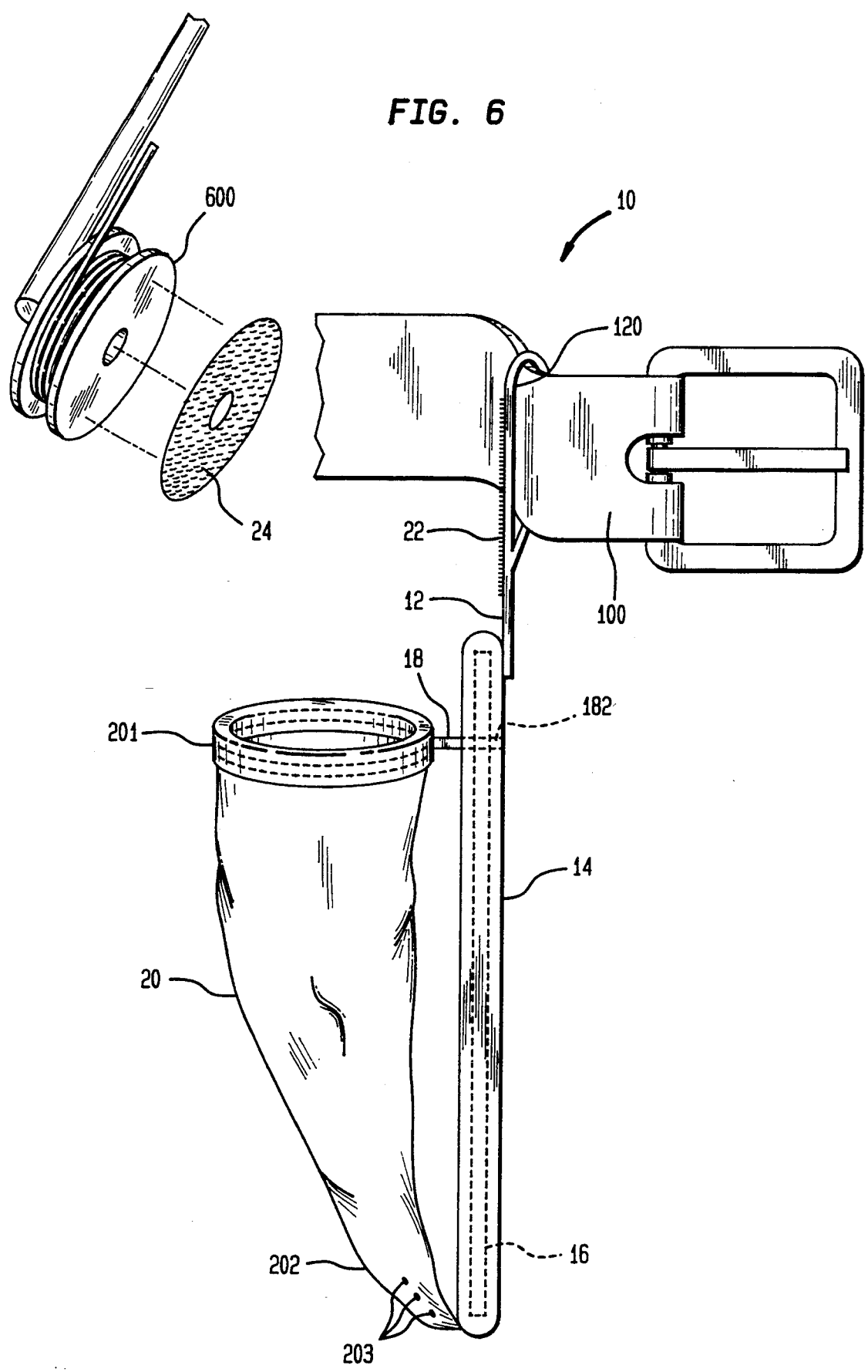
FIG. 6 is a side view of an alternative embodiment of the present invention for use in conjunction with a fly fishing rod and reel assembly.

The present invention may be easily enhanced to provide a means of holding other objects that do not have a rod. In terms of fishing, fly fishing rod and reel assemblies simply terminate at the cylindrical fly fishing reel 600 as shown in FIG. 6. To adapt holder 10 to accommodate reel 600, upper portion 12 is faced on it's outward side with one side 22 of a hook-and-loop fastening system. The complementary side 24 of the hook-and-loop fastening system is adhered to the flat side of reel 600. In this way holder 10 serves as a holder for fly fishing rod and reels as well as standard casting rod and reels. It will be apparent to those skilled in the art that this enhancement can be expanded to include other fishing accessories, e.g., knife, tools, etc., that lend themselves to having one side of a hook-and-loop fastening system attached thereto.

The advantages of the present invention are numerous. A self-tightening, belt-attachable holder for a fishing rod is simple in design, construction and use. A fishing rod is held securely in place at any angle merely by placing the rod handle in the holder's sleeve. The holder is suitable for wearing on either the left or right hand side of the fisherman without modification.

Although the invention has been described relative to a specific embodiment thereof, there are numerous variations and modifications that will be readily apparent to those skilled in the art in the light of the above teachings. For example, a variety of materials can be used to achieve the unique structure of the present invention without departing from the scope thereof. Further, the holder of the present invention is suitable for use with any object, e.g., hammer, hatchet, etc. having a rod-like handle and sufficient weight to cause the tensioning strap to collapse thereabout. It is therefore to be understood that, within the scope of the appended claims, the invention may be practiced other than as specifically described.

What is claimed as new and desired to be secured by Letters Patent of the United States is:

1. A belt-attachable holder for a rod, comprising:
   an upper portion forming an integral belt-attaching means;
   a lower portion suspended from said upper portion, said lower portion including a substantially stiff planar member extending downward from said upper portion in a substantially vertical orientation;
   a coil having at least one full turn sized to receive said rod therethrough when said coil is in a relaxed state, said coil further having first and second ends fixed to said stiff planar member; and
   a sleeve being open at a top portion thereof and sized at said top portion to receive said rod, said top portion being made from flexible material, said sleeve terminating at a substantially closed bottom maintained in a fixed relationship to said lower portion a vertical distance below said coil, said top portion having its perimeter aligned with and supported by said at least one full turn of said coil, wherein said rod can be inserted into said sleeve through said top portion and said at least one full turn to extend to said substantially closed bottom, and wherein the weight of said rod causes said at least one full turn to tighten around said rod along with said top portion.

2. A belt-attachable holder as in claim 1 wherein said first and second ends of said coil are maintained in a spaced apart relationship along a substantially horizontal plane.

3. A belt-attachable holder as in claim 1 wherein said coil is made from an inelastic material.

4. A belt-attachable holder as in claim 1 wherein said coil is made from an elastic material.

5. A belt-attachable holder as in claim 1 wherein said upper portion further includes one side of a hook-and-loop fastening system attached to an outward facing side of said upper portion, wherein a complementary side of said hook-and-loop fastening system is fixedly attached to an object whereby said object is suspended from said upper portion by means of mating said complementary side with said one side of said hook-and-loop fastening system.

6. A belt-attachable holder as in claim 1 wherein said stiff planar member is plastic.

7. A belt-attachable holder as in claim 1 wherein said stiff planar member is leather.

8. A belt-attachable holder for a fishing rod, comprising:
- an upper portion forming an integral belt-attaching means;
- a lower portion suspended from said upper portion, said lower portion housing a substantially stiff planar member extending downward through said lower portion in a substantially vertical orientation;
- a coil having at least one full turn sized to receive said fishing rod therethrough when said coil is in a relaxed state, said coil further having first and second ends fixed to said stiff planar member; and
- a sleeve of flexible material being open at a top portion thereof and sized at said top portion to receive said fishing rod, said sleeve terminating at a substantially closed bottom maintained in a fixed relationship to said lower portion a vertical distance below said coil, said top portion having its perimeter aligned with and supported by said at least one full turn of said coil, wherein said fishing rod can be inserted into said sleeve through said top portion and said at least one full turn to extend to said substantially closed bottom, and wherein the weight of said fishing rod causes said at least one full turn to tighten around said fishing rod along with said top portion.

9. A belt-attachable holder as in claim 8 wherein said upper portion forms at least one loop for receiving a belt therethrough.

10. A belt-attachable holder as in claim 8 wherein said upper portion and said lower portion are integral with one another.

11. A belt-attachable holder as in claim 8 wherein said upper portion and said lower portion are made from cloth.

12. A belt-attachable holder as in claim 8 wherein said first and second ends of said coil are maintained in a spaced apart relationship along a substantially horizontal plane.

13. A belt-attachable holder as in claim 8 wherein said coil is made from an inelastic material.

14. A belt-attachable holder as in claim 13 wherein said inelastic material extends substantially perpendicular to said stiff planar member.

15. A belt-attachable holder as in claim 8 wherein said coil is made from an elastic material.

16. A belt-attachable holder as in claim 8 wherein said substantially closed bottom is fixedly attached to said lower portion and said stiff planar member.

17. A belt-attachable holder as in claim 8 wherein said sleeve is made from cloth.

18. A belt-attachable holder as in claim 8 wherein said top portion encases said at least one full turn.

19. A belt-attachable holder as in claim 8 wherein said upper portion further includes one side of a hook-and-loop fastening system attached to an outward facing side of said upper portion, wherein a complementary side of said hook-and-loop fastening system is fixedly attached to an object whereby said object is suspended from said upper portion by means of mating said complementary side with said one side of said hook-and-loop fastening system.

20. A belt-attachable holder as in claim 8 wherein said stiff planar member is plastic.

21. A belt-attachable holder as in claim 8 wherein said stiff planar member is leather.

* * * * *